US012638390B2

(12) United States Patent
Chang et al.

(10) Patent No.: US 12,638,390 B2
(45) Date of Patent: May 26, 2026

(54) PLANAR WAVEGUIDE-BASED OPTOFLUIDIC SENSOR AND USE THEREOF

(71) Applicant: NATIONAL CHUNG CHENG UNIVERSITY, Chiayi County (TW)

(72) Inventors: Guo-En Chang, New Taipei (TW); Lai-Kwan Chau, Chiayi (TW); Devesh Barshilia, Nainital (IN); Chia-Jui Hsieh, Chiayi (TW)

(73) Assignee: NATIONAL CHUNG CHENG UNIVERSITY, Chiayi County (TW)

( * ) Notice: Subject to any disclaimer, the term of this patent is extended or adjusted under 35 U.S.C. 154(b) by 235 days.

(21) Appl. No.: 18/355,419

(22) Filed: Jul. 20, 2023

(65) Prior Publication Data

US 2024/0044789 A1    Feb. 8, 2024

(30) Foreign Application Priority Data

Aug. 2, 2022    (TW) .................................. 111128988

(51) Int. Cl.
G01N 21/41    (2006.01)
G01N 21/01    (2006.01)

(52) U.S. Cl.
CPC ............. G01N 21/41 (2013.01); G01N 21/01 (2013.01)

(58) Field of Classification Search
CPC .... G01N 21/01; G01N 21/0303; G01N 21/05; G01N 21/41; G01N 21/4133; G01N 21/554; G01N 21/7703

USPC .......................................................... 356/128
See application file for complete search history.

(56) References Cited

U.S. PATENT DOCUMENTS

| | | | | |
|---|---|---|---|---|
| 2001/0026943 A1* | 10/2001 | Dickopf | .............. | G01N 21/553 |
| | | | | 436/164 |
| 2012/0196383 A1* | 8/2012 | Nitkowski | ......... | G01N 21/7703 |
| | | | | 422/69 |
| 2014/0204372 A1* | 7/2014 | Pang | .................... | G01N 21/658 |
| | | | | 356/244 |
| 2017/0016827 A1* | 1/2017 | Gervais | ................ | G01N 21/648 |
| 2021/0132055 A1* | 5/2021 | Denomme | ....... | G01N 33/54373 |
| 2022/0410161 A1* | 12/2022 | Laurent | .................. | C12M 23/16 |

FOREIGN PATENT DOCUMENTS

| | | | | |
|---|---|---|---|---|
| CA | 2270276 A1 * | 10/2000 | ......... | G01N 21/7703 |
| CN | 109894168 A * | 6/2019 | | |

* cited by examiner

*Primary Examiner* — Sunghee Y Gray
(74) *Attorney, Agent, or Firm* — Apex Juris, pllc; Cera Oh

(57) ABSTRACT

A planar waveguide-based optofluidic sensor and use thereof are provided, wherein the optofluidic sensor includes a substrate, an adhesive layer, a waveguide plate, and a microfluidic module layer. The adhesive layer is disposed on both sides of the substrate, the waveguide plate is disposed on the adhesive layer to be bonded with the substrate, and a hollow gap is formed between the substrate and the waveguide plate by the adhesive layer, and the microfluidic module layer is disposed on the waveguide plate and has a microfluidic channel, a fluid sample injection port, and an output port. The optofluidic sensor may detect the refractive index of the fluid sample with high sensitivity.

7 Claims, 4 Drawing Sheets

PLANAR WAVEGUIDE-BASED OPTOFLUIDIC SENSOR AND USE THEREOF

CROSS-REFERENCE TO RELATED APPLICATION

This application claims priority from Taiwan Patent Application No. 111128988, filed on Aug. 2, 2022, in the Taiwan Intellectual Property Office, the content of which is hereby incorporated by reference in its entirety for all purposes.

BACKGROUND OF THE INVENTION

1. Field of the Invention

The present disclosure relates to an optofluidic sensor and use thereof, in particular to a planar waveguide-based optofluidic sensor and use thereof.

2. Description of the Related Art

Refractive Index (RI) sensing is a classic analytical method for monitoring molecular interactions and quantitatively analyzing chemical reactions; compared with other measurement methods, refractive index sensing has the advantages of high sensitivity, label-free, and real-time detection.

The synergistic integration of optofluidic refractometer-based sensors, micro- and nano-based optical systems, and microfluidic technology has achieved unparalleled technological development, which has great potential for a wide range of applications in the fields of clinical diagnosis, chemical analysis, and food safety. In addition to enhancing the sensitivity and resolution of sensing, this sensing technology has the uniqueness of reducing the size and cost of equipment. In view of the aforementioned advantages, significant progress has been made in the development of refractive index sensors based on different structures and sensing mechanisms.

To achieve refractive index sensing with high sensitivity, different refractive index sensors have been developed, such as guided film-resonance sensors, prism sensors, fiber nano-plasma sensors, waveguide (WG) sensors, surface plasma-resonance sensors, or photonic crystal sensors.

Despite the exhibition of excellent refractive index sensing, these technologies lack certain ideal characteristics for commercial use, such as cost effects, manufacturing methods that allow mass production, and fast reading systems. These technologies typically require complex and time-consuming vacuum manufacturing processes for thin-film deposition, dry etching, and electron beam lithography for sensor manufacturing, thus increasing production time and reducing productivity. Another limitation is that the wavelength- or polarization-based sensing methods require complex post-processing to obtain refractive index and does not provide real-time detection capability. Finally, optical reading systems, such as high-stability laser devices, high-resolution spectrometers, and high-precision translation/rotation platforms, usually require precise and expensive instruments and components, leading to detection systems being bulky and expensive.

In view of the aforementioned deficiencies in the prior art, there is a need to develop a compact refractive index sensor, which has the advantage of being able to be produced on a large scale and inspected in real time for cost reduction and practical commercial application.

SUMMARY OF THE INVENTION

In view of the aforementioned requirements, the purpose of the present disclosure aims to provide an optofluidic sensor and use thereof able to sensitively sense refractive index in real time with fine resolution, in particular to a planar waveguide-based optofluidic sensor and use thereof. In addition, a metal nanoparticle layer may be further disposed on the planar waveguide, and the high sensitivity of metal nanoparticles helps to enhance the performance of sensors used to detect biological samples.

Waveguide (WG) is a conventional light-propagation optical device, and the field (evanescent field) distribution of the waveguide mode is closely related to the refractive index of the core and the cladding layer; thus, changing the refractive index of the cladding layer results in a change in the waveguide mode of the waveguide.

In the present disclosure, the inventor has proposed and developed a simple, economical optofluidic waveguide-type refractive index sensor that allows mass production, that is, a planar waveguide-based optofluidic sensor, including a substrate, an adhesive layer, a waveguide plate, and a microfluidic module layer. Wherein, the adhesive layer is disposed on both sides of the substrate, the waveguide plate is disposed on the adhesive layer to be bonded with the substrate, and because the adhesive layer is only disposed on both sides of the substrate, a hollow gap is formed between the substrate and the waveguide plate. The microfluidic module layer is disposed on the waveguide plate, and the microfluidic module layer has a microfluidic channel, a fluid sample injection port, and a fluid sample output port.

A part of the waveguide plate under the microfluidic channel in the microfluidic module layer is used as a sensing area. An analyte is injected into the microfluidic channel through the fluid sample injection port, light is coupled to the waveguide plate after a light source emits an incident light along a direction parallel to the waveguide plate, and a transmitted light is formed from one side of the waveguide plate to another side of the waveguide plate through the sensing area (that is, the part of the waveguide plate below the microfluidic channel). The introduction of different types or concentrations of analytes into the sensing area causes the light intensity to change in refractive index as the light passes through the adjacent area of the waveguide-sensing area-waveguide plate and makes the field (evanescent field) of the waveguide mode change in intensity, i.e., coupling depletion. Therefore, by monitoring the change in light intensity, the refractive index detection may be performed with high sensitivity in real time; further, the coupling loss is used as a refractive index function of the analyte and converted to obtain the refractive index of the analyte.

Wherein, for a system for outputting and receiving light sources, a highly stable and inexpensive light source system may be adopted to reduce production costs, for example, a light-emitting diode (LED) as the light source output, a photodetector (PD) as the light source system of the light source receiver, or any other inexpensive light source system with high stability, enabling simple and real-time refractive index detection.

Furthermore, to make the planar waveguide-based optofluidic sensor provided by the present disclosure have higher sensing sensitivity, a metal nanoparticle layer may be further coated on the waveguide plate of the optofluidic sensor (that is, the side in contact with the microfluidic module layer) to enhance the performance for detection of biological samples. Wherein, the metal nanoparticles in the metal nanoparticle layer may adsorb capture identifiers in the fluid sample that can trap the analyte. When the light source emits an incident light to the waveguide plate, which is coupled with light, the light passing through the sensing area from one side of the waveguide plate and propagating to the other side of the waveguide plate interacts with metal nanoparticles, resulting in strong absorption and scattering of the light. Rather, the position and intensity of the photopeak absorption depend on the size of the metal nanoparticles and the refractive index of the surrounding media. When different fluid samples are injected into the sensing area, the change in the concentration of the analyte in the fluid sample will lead to a large variation in the refractive index and change the intensity of the transmitted light. Because metal nanoparticles would absorb evanescent waves, the intensity of the transmitted light may be changed more significantly to achieve real-time and sensitive refractive index detection.

In summary, the planar waveguide-based optofluidic sensor and use thereof provided by the present disclosure are relatively simple and rapid in terms of the manufacturing process because no photolithography or vacuum process is used in the manufacturing process. Moreover, the light source system used for the optofluidic sensor is a common inexpensive light source system, and the material of the optofluidic sensor is also a common inexpensive material, thus significantly reducing production costs and being suitable for high-throughput mass production; in addition, the planar waveguide-based optofluidic sensor provided by the present disclosure also has the advantages of high sensitivity and real-time detection.

Hereinafter, the technical features of the present disclosure, that is, the planar waveguide-based optofluidic sensor proposed, are to be described through specific embodiments.

BRIEF DESCRIPTION OF THE DRAWINGS

The present disclosure is further illustrated with the following figures:

FIG. 1 is a schematic diagram of the structure and the sensing mechanism thereof of the planar waveguide-based optofluidic sensor of the present disclosure, wherein FIG. 1(a) is a three-dimensional view of the optofluidic sensor, FIG. 1(b) is a top view of the optofluidic sensor, FIG. 1(c) is a side view of the optofluidic sensor, and FIG. 1 (d) is a schematic diagram of the sensing mechanism of the optofluidic sensor;

FIG. 4(c) is an image of the metal nanoparticle layer under a scanning electron microscope (SEM), and FIG. 4 (d) is a physical product photo of the optofluidic sensor.

DESCRIPTION OF THE PREFERRED EMBODIMENTS

To facilitate the review of the technical features, contents, advantages, and achievable effects of the present disclosure, the embodiments together with the drawings are described in detail as follows. However, the drawings are used only for the purpose of indicating and supporting the specification, which is not necessarily the real proportion and precise configuration after the implementation of the present disclosure. Therefore, the relations of the proportion and configuration of the attached drawings should not be interpreted to limit the actual scope of implementation of the present disclosure.

Unless otherwise defined, all terms used herein (including technical and scientific terms) have the meanings commonly understood by a person with ordinary skill in the art. It should be further understood that, unless explicitly defined herein, the terms such as those defined in commonly used dictionaries should be interpreted as having definitions consistent with their meaning in the context of the related art and the present disclosure and should not be construed as idealized or overly formal.

All numerical values herein are understood to be modified by "about". As used herein, the term "about" is meant to encompass a variation of ±10%.

Figure 1:
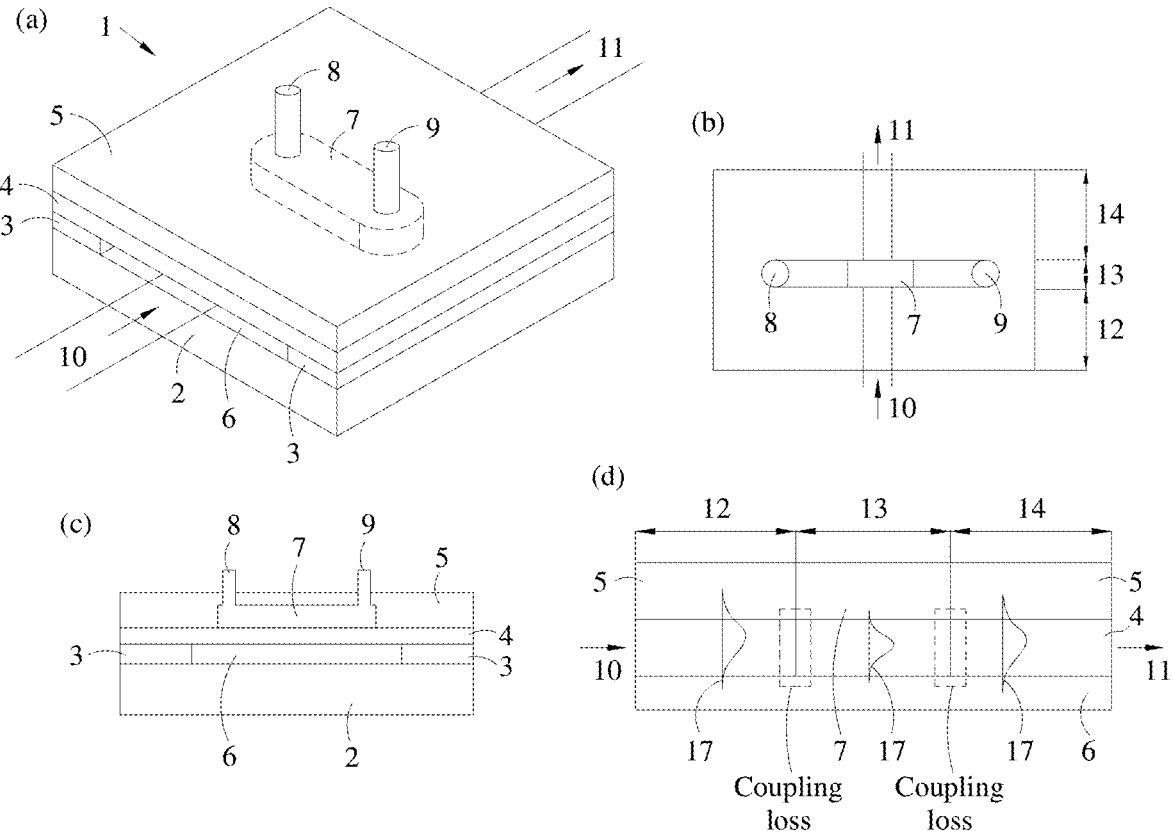

First, referring to FIG. 1, FIG. 1 is a schematic diagram of the structure and the sensing mechanism thereof of the planar waveguide-based optofluidic sensor of the present disclosure. FIG. 1 (a), FIG. 1 (b), and FIG. 1 (c) are respectively a three-dimensional view, a top view, and a side view of the optofluidic sensor 1. It can be seen from the figures that the optofluidic sensor 1 includes: a substrate 2, an adhesive layer 3, a waveguide plate 4, and a microfluidic module layer 5; Wherein, the adhesive layer 3 is disposed on both sides of the substrate 2, the waveguide plate 4 is disposed on the adhesive layer 3 to be bonded with the substrate 2, and because the adhesive layer 3 is only disposed on both sides of the substrate 2, a hollow gap 6 (regarded as an air layer) is formed between the substrate 2 and the waveguide plate 4. The microfluidic module layer 5 is disposed on the waveguide plate 4, and the microfluidic module layer 5 has a microfluidic channel 7, a fluid sample injection port 8, and a fluid sample output port 9.

Referring again to FIG. 1 (d), FIG. 1 (d) is a schematic diagram of the sensing mechanism of the optofluidic sensor. A part of the waveguide plate 4 under the microfluidic channel 7 in the microfluidic module layer 5 is used as a sensing area 13. An analyte is injected into the microfluidic channel 7 through the fluid sample injection port 8, light is coupled to the waveguide plate 4 after a light source emits an incident light 10 along a direction parallel to the waveguide plate 4, and a transmitted light 11 is formed from one side of the waveguide plate 4 to another side of the waveguide plate 4 through the sensing area 13 (that is, the part of the waveguide plate 4 below the microfluidic channel). The introduction of different types or concentrations of analytes into the sensing area causes the light intensity to change in refractive index as the light passes through the adjacent area (that is, the adjacent area of the waveguide plate areas 12 and 14 and the sensing area 13 in the figure) of the waveguide-sensing area-waveguide plate and makes the field (evanescent field) of the waveguide mode change in intensity, i.e., coupling depletion. Therefore, by monitoring the change in light intensity, the refractive index detection may be performed with high sensitivity in real time, and further, the coupling loss is used as a refractive index function of the analyte and converted to obtain the refractive index of the analyte.

To reduce production costs, a common commercial glass substrate may be used for the substrate 2, a borosilicate glass coverslip may be used for the waveguide plate 4, and the microfluidic module layer 5 may be manufactured through injection molding of cyclic olefin copolymer (COC). In addition, any adhesive for bonding glass may be used for the adhesive layer 3, preferably photocurable UV adhesive.

Furthermore, to realize the waveguide, the waveguide plate 4 must be surrounded by a cladding layer with a lower refractive index; therefore, as can be seen from FIG. 1, the important technical feature of the optofluidic sensor 1 provided by the present disclosure lies in the hollow gap 6 (which may be regarded as an air layer). The waveguide plate 4 may be suspended above the substrate 2 to facilitate the waveguide light to enter the core of the waveguide, and the refractive index of the waveguide plate 4 is greater than the hollow gap 6, that is, greater than the refractive index of air. When a borosilicate glass coverslip is used for the waveguide plate 4, the refractive index thereof is about 1.52; different from the traditional etching method used to partially or completely remove the sacrificial layer under the core of the waveguide, the present disclosure attaches the waveguide plate 4 thereon by coating the adhesive layer 3 on both sides of the substrate 2 to make air trapped between the substrate 2 and core of the waveguide, which allows the waveguide plate 4 to form a suspended state. In this suspended manner, the contrast ratio of the significant refractive index between the waveguide plate 4 and the air (hollow gap 6) improves the optical limitation of the waveguide plate 4 and ensures that minimal light is leaked into the substrate 2. The microfluidic channel 7 in the microfluidic module layer 5 is located at the center of the waveguide plate 3 to promote the interaction between light and the analyte in the fluid sample and further improve the stability and accuracy of the optofluidic sensor 1.

When cyclic olefin copolymer is used for the microfluidic module layer 5, the refractive index thereof is about 1.56; when the fluid sample is injected into the microfluidic channel 7, the refractive index thereof is about 1.333 to 1.373; at this moment, the waveguide plate 4 forms the adjacent area between the waveguide plate areas 12 and 14 and the sensing area 13 as shown in FIG. 1 (b) and FIG. 1 (d).

When the light passes through the sensing area 13 from one side of the waveguide plate 4 to the other side of the waveguide plate 4, since the refractive index of the microfluidic module layer 5 above the waveguide areas 12 and 14 is higher than that of the microfluidic channel 7 injected with the fluid sample above the sensing area 13, the evanescent field 17 of the waveguide plate areas 12 and 14 is more significant than that of the sensing area 13 (with reference to FIG. 1 (d)). Therefore, the light passing through the interface between the waveguide plate areas 12 and 14 and the sensing area 13 would cause a mode mismatch, resulting in coupling loss. As the refractive index of the fluid sample changes, the distribution of the evanescent field 17 in the sensing area 13 also changes accordingly. The coupling loss due to the mode mismatch may be used as a refractive index function of the analyte, and therefore the intensity of the received transmitted light 11 may also be used as a refractive index function of the analyte. Therefore, the refractive index change caused by the concentration of the analyte in the fluid sample may be converted into a change in the intensity of the transmitted light 11, further providing a basis for conversion of the concentration of the analyte for the optofluidic sensor 1.

In an embodiment, when the waveguide plate 4 is a borosilicate glass coverslip, and when cyclic olefin copolymer (COC) is used for the microfluidic module layer 5 as material for manufacturing processes, a fine resolution of $5.65\times10^{-4}$ RIU may be achieved when the actual refractive index test is conducted.

Figure 2:
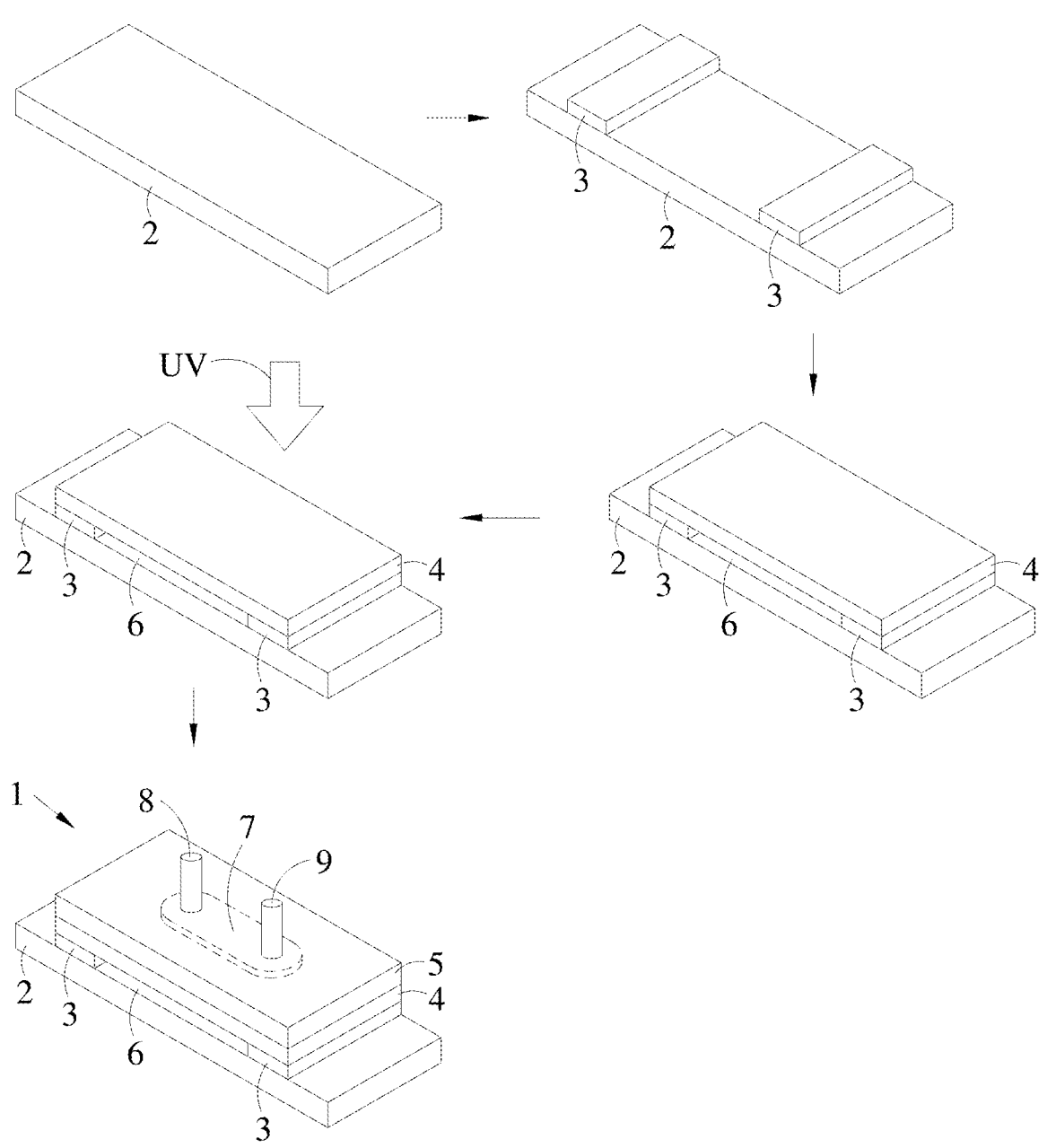
FIG. 2 is a schematic diagram of the preparation process of the planar waveguide-based optofluidic sensor of the present disclosure.

Referring to FIG. 2, FIG. 2 is a schematic diagram of the preparation process of the planar waveguide-based optofluidic sensor of the present disclosure. The present disclosure adopts non-vacuum and non-photolithography technology to make the optofluidic sensor and uses general commercial glass (25.4×76.2 mm) as the substrate 2. To ensure fine adhesion between the waveguide plate 4 and the substrate 2, the substrate 2 is cleaned with deionized water and air-dried with a nitrogen gun, which is then baked in an oven for 1 hour; afterward, the same cleaning steps are applied to clean the waveguide plate 4 (24×50 mm, thickness 0.2 mm) and the microfluidic module layer 5 (21×46 mm, thickness 2 mm). Wherein, the waveguide plate 4 is a borosilicate glass coverslip, and the microfluidic module layer 5 includes a microfluidic channel 7 with 32×3 mm and a thickness of 0.2 mm, which is made of COC material through injection molding technology. After cleaning, UV glue is used as the adhesive layer 3 for the coating on both sides of the substrate 2, the waveguide plate 4 is glued thereon, and the UV glue is irradiated for 15 minutes to harden the UV glue; it is necessary to prevent the UV glue from overflowing to the middle of the waveguide plate 4 (that is, the sensing area 13) during bonding. Then, the microfluidic module layer 5 is bonded to the top of the waveguide plate 4; by connecting two flexible tubes to both sides of the microfluidic channel 7, one side serves as a fluid sample injection port 8, and the other side serves as a fluid sample output port 9. This simple manufacturing method avoids costly and tedious photolithography processes, resulting in a highly practical refractive index sensor suitable for mass production, and the manufacturing cost is less than $1 with a significant cost effect.

Figure 3:
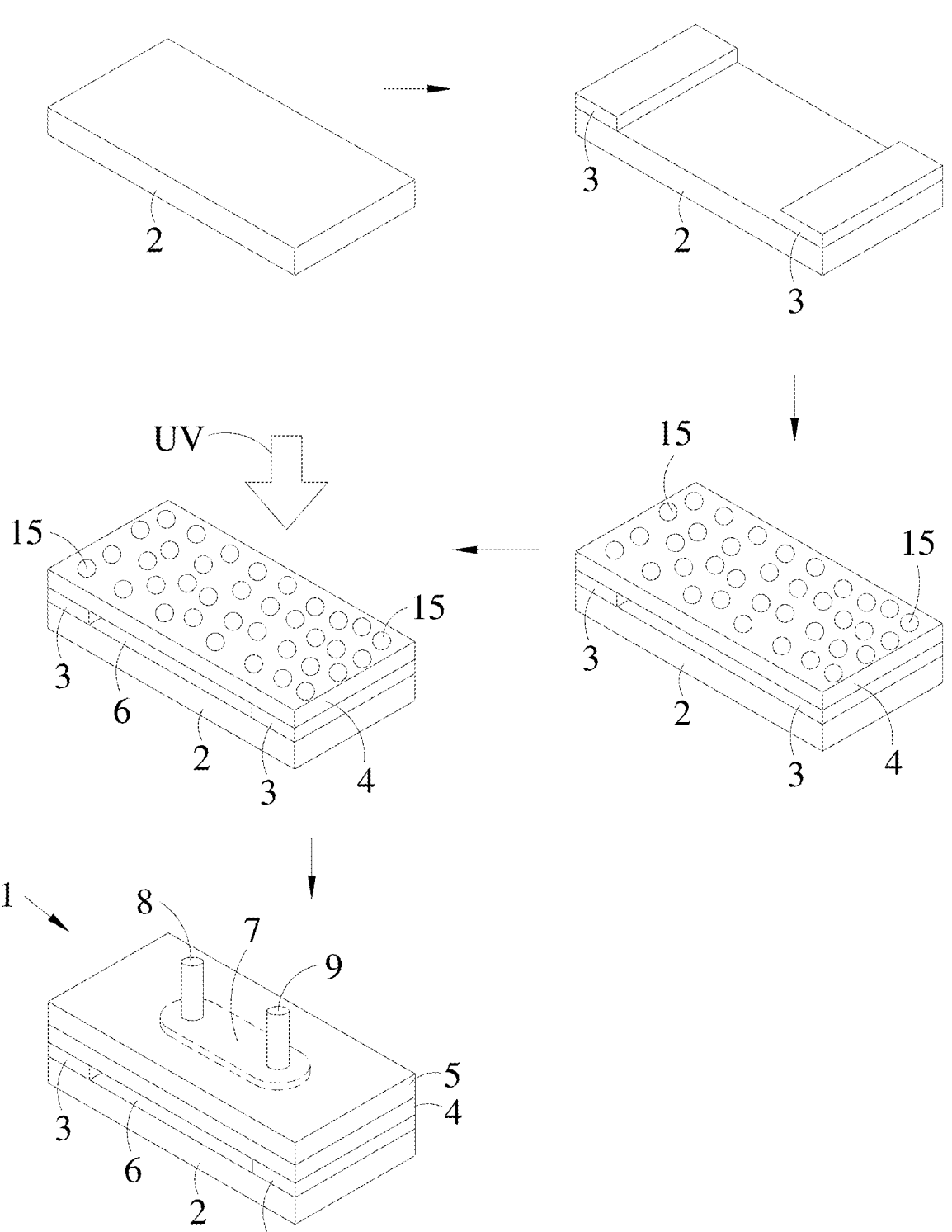
FIG. 3 is a schematic diagram of the preparation process of the planar waveguide-based optofluidic sensor of the present disclosure, which is further coated with a metal nanoparticle layer on the waveguide plate.
Figure 4:
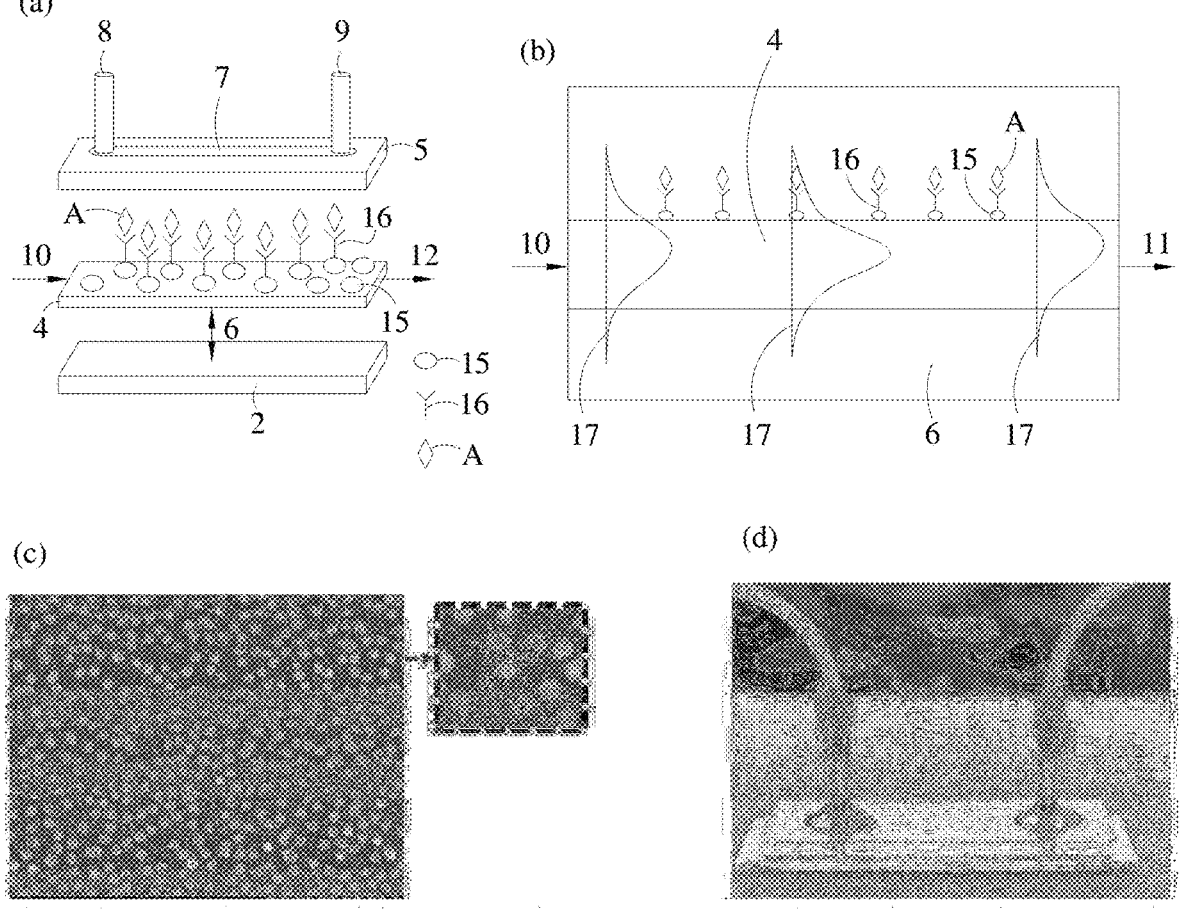
FIG. 4 is a schematic diagram of the preparation process of the planar waveguide-based optofluidic sensor of the present disclosure, which is further coated with a metal nanoparticle layer on the waveguide plate, wherein FIG. 4 (a) is a schematic diagram of the combination of metal nanoparticles and capture identifiers that capture the analyte, FIG. 4 (b) is a schematic diagram of the variation in the evanescent field when the light penetrates the waveguide plate.

Referring to FIG. 3 and FIG. 4, FIG. 3 is a schematic diagram of the preparation process of the planar waveguide-based optofluidic sensor of the present disclosure, which is further coated with a metal nanoparticle layer on the waveguide plate; FIG. 4 is a schematic diagram of the preparation process of the planar waveguide-based optofluidic sensor of the present disclosure, which is further coated with a metal nanoparticle layer on the waveguide plate. To make the planar waveguide-based optofluidic sensor 1 provided by the present disclosure have higher sensing sensitivity to enhance the performance for detection of biological samples, a metal nanoparticle layer 15 may be further coated on the waveguide plate 4 of the optofluidic sensor 1 (that is, the side in contact with the microfluidic module layer 5). Wherein, the metal nanoparticles in the metal nanoparticle layer 15 may adsorb capture identifiers 16 in the fluid sample that can trap the analyte A; as to the preparation method of the optofluidic sensor 1 described above, only the waveguide plate 4 used is coated with the metal nanoparticle layer 15, the description of which shall not be repeated herein.

When the light source emits an incident light 10 to the waveguide plate 4, which is coupled with light, the light passing through the sensing area 13 from one side of the waveguide plate 4 and propagating to the other side of the waveguide plate 4 interacts with metal nanoparticles, resulting in strong absorption and scattering of the light. Rather, the position and intensity of the photopeak absorption depend on the size of the metal nanoparticles and the refractive index of the surrounding media. When different fluid samples are injected into the sensing area 13, the change in the concentration of the analyte A in the fluid sample will lead to a large variation in the refractive index and change the intensity of the transmitted light 11. Because metal nanoparticles would absorb evanescent waves, the intensity of the transmitted light 11 may be changed more significantly to achieve real-time and sensitive refractive index detection.

Preferably, the metal nanoparticles in the metal nanoparticle layer 15 may be selected from the group consisting of gold nanoparticles, silver nanoparticles, or copper nanoparticles, more preferably gold nanoparticles.

Metal nanoparticles may be spherical, rod-shaped, shell-shaped, triangular-shaped, prism-shaped, star-shaped, etc., preferably spherical; in addition, the average particle size of metal nanoparticles is 10 to 16 nm, preferably 13 nm.

The capture identifier 16 may be selected from the group consisting of antibodies, peptides, hormone receptors, agglutinins, saccharides, chemical recognition molecules, deoxyribonucleic acid, ribonucleic acid, and aptamers.

In an embodiment, when the waveguide plate 4 is a borosilicate glass coverslip on which a metal nanoparticle layer 15 of spherical metal nanoparticles with an average particle size of 13 nm is coated, and when cyclic olefin copolymer (COC) is used for the microfluidic module layer 5 as material for manufacturing processes, a fine resolution of $9.10 \times 10^{-5}$ RIU may be achieved when the actual refractive index test is conducted.

In summary, the planar waveguide-based optofluidic sensor provided by the present disclosure is relatively simple and rapid in terms of the manufacturing process because no photolithography or vacuum process is used in the manufacturing process. Moreover, the light source system used for the optofluidic sensor is a common inexpensive light source system, and the material of the optofluidic sensor is also a common inexpensive material, thus significantly reducing production costs and being suitable for high-throughput mass production; in addition, the planar waveguide-based optofluidic sensor provided by the present disclosure also has the advantages of high sensitivity and real-time detection.

A person with ordinary skill in the art can understand from the aforementioned content that the present disclosure may be exemplified by other specific forms without changing the technical concepts or essential features of the present disclosure. In this regard, the exemplary aspects disclosed herein are for illustrative purposes only and should not be construed as limiting the scope of the present disclosure. In contrast, the present disclosure tends to cover not only these exemplary patterns, but also a wide range of variations, modifications, equivalents, and other patterns that may be included in the spirit and scope of the present disclosure as defined in the claims attached hereto.

What is claimed is:

1. An optofluidic sensor for sensing a refractive index of an analyte, comprising:
   a substrate;
   an adhesive layer, disposed on a top surface of the substrate, the adhesive layer including a first portion and a second portion spaced apart from the first portion;
   a waveguide plate, disposed on the adhesive layer to be bonded with the substrate, wherein a hollow gap is formed between the substrate and the waveguide plate and between the first portion and the second portion of the adhesive layer; and
   a microfluidic module layer, disposed on the waveguide plate opposite to the hollow gap and having a microfluidic channel, a fluid sample injection port, and a fluid sample output port, wherein
   the fluid sample injection port and the fluid sample output port are respectively positioned at two ends of the microfluidic channel; and
   a part of the waveguide plate corresponding to a bottom of the microfluidic channel is used as a sensing area.

2. The optofluidic sensor according to claim 1, wherein the substrate is a glass substrate.

3. The optofluidic sensor according to claim 1, wherein the adhesive layer is light-curing UV adhesive.

4. The optofluidic sensor according to claim 1, wherein the waveguide plate is a borosilicate glass coverslip.

5. The optofluidic sensor according to claim 1, wherein the microfluidic module layer is made through injection molding of cyclic olefin copolymer.

6. The optofluidic sensor according to claim 1, wherein a metal nanoparticle layer is further coated on the waveguide plate, and then the microfluidic module layer is disposed on the metal nanoparticle layer.

7. The optofluidic sensor according to claim 6, wherein the metal nanoparticle used in the metal nanoparticle layer is selected from a group consisting of gold nanoparticles, silver nanoparticles, or copper nanoparticles.

* * * * *